J. BOWLES.
Thrashing Machine.
No. 2,661.
Patented June 11, 1842.
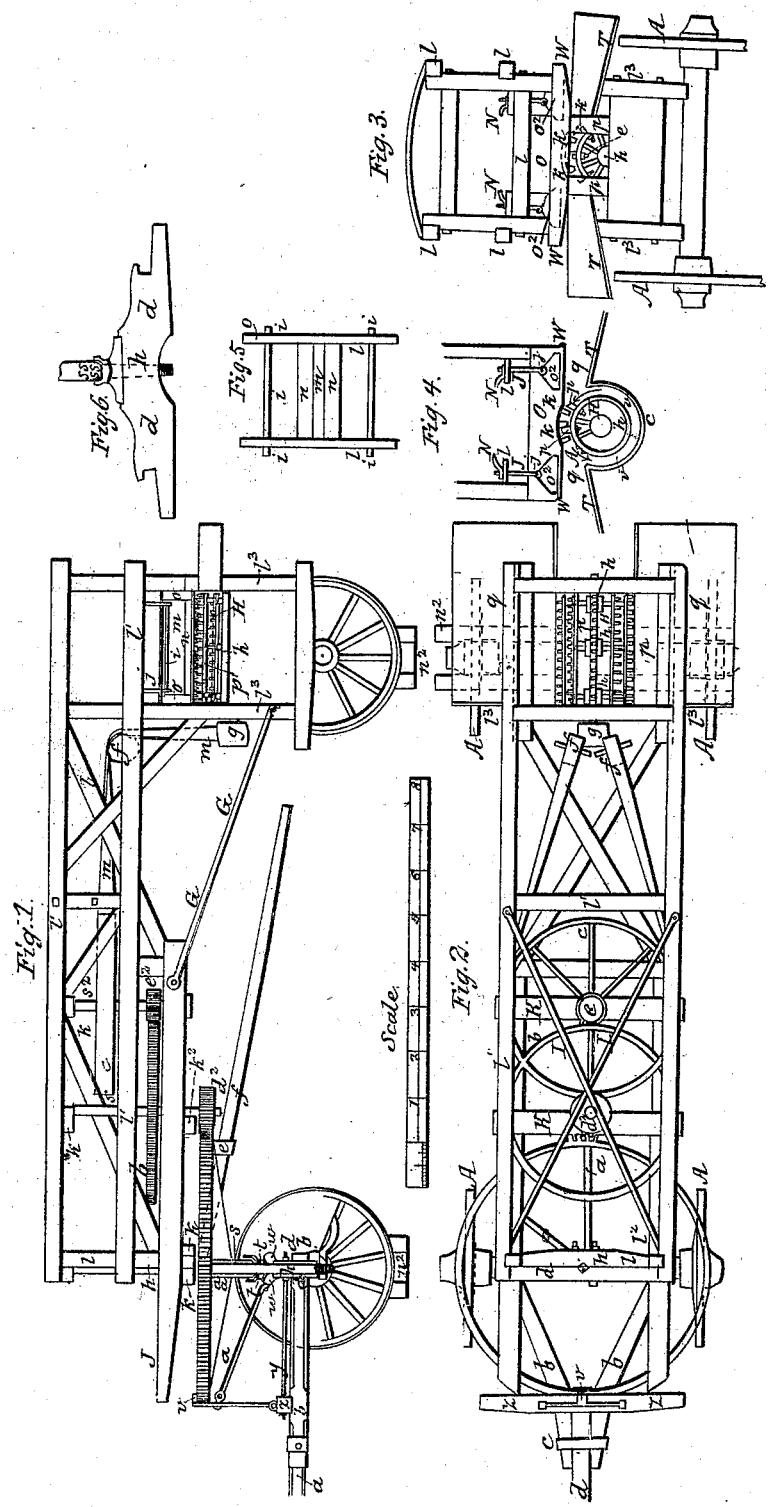

UNITED STATES PATENT OFFICE.

JESSE BOWLES, OF LOUISA COUNTY, VIRGINIA.

THRESHING-MACHINE.

Specification of Letters Patent No. 2,661, dated June 11, 1842.

*To all whom it may concern:*

Be it known that I, JESSE BOWLES, of the county of Louisa and State of Virginia, have invented a new and useful Improvement in Machines for Separating Grain from Straw, called "Bowles's Portable Threshing-Machine and Horse-Power," which is described as follows, reference being had to the annexed drawings of the same, making part of this specification, of which—

Figure 1 is a side view; Fig. 2, a top view; Fig. 3, end view of the rear; Fig. 4, transverse section of the threshing part; Fig. 5, a bird's eye view of the concave and its sides; Fig. 6, sectional view of the front axle tree and part of the bolt.

Several parts of this machine being constructed in the usual manner need not therefore be particularly described—such as the four wagon wheels A on which the combined horsepower and threshing machine is placed and by which it is removed from place to place—the axle tree $d$—hounds $b$—tongue $a$—the whiffle tree $z$.

The frame $l^1$ $l^2$ $l^3$ of this portable machine for threshing grain &c. is composed of four longitudinal timbers $l'$ united by suitable transverse horizontal girts and vertical posts and diagonal braces all well framed together, the posts at the front end of the frame being extended down below the bottom timbers and framed into shorter horizontal timbers $l^2$ to which the lower bridge trees $k^2$ are secured so as to form a small hanging frame for the support of the forward portion of the gearing—and the posts $l^3$ at the rear end of the frame are also extended below the bottom long timbers of the frame united by suitable cross and side timbers in order to form a frame for the reception of the several parts of the threshing machine; which hanging frames are securely braced to the main frame by suitable diagonal braces at the sides and top of the main frame.

The frame is connected to the hind axletree by strong bolts and braces, and to the forward axletree by the stationary wrought iron vertical shaft $h$ on which the principal driving shaft $a$ of the threshing machine turns. This shaft is fixed to the frame and passes through the said forward axle tree having a nut $x$ screwed on its lower extremity during the operation of threshing and which is taken off while moving the machine from place to place.

The revolving threshing cylinder H is composed of parallel cast iron rings fixed on a horizontal shaft having dovetailed grooves in the periphery of said rings into which are inserted dovetailed bars parallel with the axis of the cylinder and with their bases or widest parts nearest the center of the cylinder having wedge shaped teeth $p$ on the outer surfaces of said bars corresponding with the teeth $k$ of the adjustable curve $n$ the aforesaid bars being made fast to the rings by screw bolts passed through them and the rings having nuts on the same inside the rings.

The aforesaid threshing cylinder is arranged in the frame in the manner of other threshing cylinders with its shaft passing through the frame and turning in boxes thereon and having on its outer extremity a pulley $g$ around which is passed the band $m$ leading to the pulley $c$ of the horse power, said revolving threshing cylinder having arranged over it the adjustable curve $n$ and under it the smooth segment concave $c$ and at the sides the inclined feeding tables T.

The curve $n$ armed with teeth is arranged above the cylinder as before stated instead of below it being suspended by two horizontal parallel rods or bars $i$ $i$ raised or lowered at pleasure in order to raise the concave and adjust the teeth of the curve exactly to those of the cylinder, the said curve adjusts itself vertically when any hard substance enters the machine and thus prevents the destruction of the teeth in the manner hereafter described by means of certain openings $o$ $o$.

From the extremities of the curve wings W W of sheet iron or thin boards are extended horizontally to the right and left for guiding the grain to the cylinder and curve and preventing its escape at the sides.

A smooth concave C a little more than a semicircle and of greater diameter than the cylinder which revolves therein is arranged below the cylinder at a convenient distance therefrom inclosing a space $r$ between the concave and cylinder from the edges of which concave on either side there extends an inclined feeding table T T so arranged that the cylinder may be fed from either side and which is turned up at the sides so as to form the guards or wings W W before mentioned to prevent the escape of the grain at the sides which tables extend over the hind wagon wheels. A part of the table is made horizontal on which the bundles of grain are laid. The remaining portions incline from the cylinder at an angle of about 8 or 10 degrees.

The gearing for propelling the threshing machine is constructed and arranged in the following manner: The main driver $a$ is a large cog wheel with a hollow cylindrical hub $s$ fixed in the center thereof which turns on the cylindrical shaft $h$ below the hanging frame $l^2$ in an ink or oil cup $t$ fixed to said shaft $h$ below the hub under which ink a bolster $w$ is fixed. The sweeps $f^2$ to which the animals are attached for propelling the threshing machine are inserted into sockets $e$ formed on the under side of this driver $a$. The driver $a$ works into a horizontal pinion $d^2$ fixed on a vertical hanging shaft $s$ turning in suitable boxes in the frame. On this shaft and turning with it is the second driving cog wheel $b$ which turns below the bottom long timbers of the frame $l'$ and above the short timbers $l^2$ and gears into the second pinion or leader $e^2$ which is fixed on another vertical hanging shaft $s^2$ which turns in boxes in the cross timbers or bridge trees $k^2$ on which shaft is also fixed a horizontal driving or band wheel $c$ geared to the pulley $g$ on the shaft of the threshing cylinder $h$ by means of an endless flexible band $m$ which passes around said pulley being also conducted over guide pulleys $f$ $f$.

In moving the machine from place to place the levers $f^2$ are withdrawn from their sockets the tongue $a$ raised by the hook $v$ brought to a vertical position and passed over the edge of the main driver $a$ in which position it is held by the brace $u$ hooked to an eye in the bolster $w$ which holds up the tongue and hounds $b$. The nut $x$ is also removed.

The machine is prepared for the operation of threshing by slipping out the tongue unshipping the brace $u$ dropping the hook $v$ screwing up the nut $x$ placing the scotches or chocks $n^2$ under the wheels inserting the sweeps $f^2$ into the sockets $e$ removing the horses from the tongue and attaching them to the sweeps $f^2$ and being driven around in a circle under the frame (which is sufficiently raised for that purpose) the threshing machine is put in motion. The bundles of grain placed on the horizontal part of the table are then untied opened and placed upon the inclined part of the plane or table T from whence they are drawn in between the teeth of the cylinder and those of the curve which separate the grain from the straw. When the machine has been used sufficiently on one side its motion may be reversed and the other side used. By this change the opposite sides of the boxes are worn to correspond with the wear of the other parts.

The adjustable curve $m$ $n$ or inverted concave C armed with teeth for separating the grain from the straw may in its construction and operation be described more fully as follows. The sides marked $o$ $o$ are made a little longer than the width of the machine and of suitable width and thickness concave on the under side about the middle thereof to admit the segments or curved boards or slots $n$ forming the concave and which connect the said sides together being perforated with large obtuse angled openings $o^2$ $o^2$ through which are inserted the horizontal parallel rods $i$ $i$ on which the curve is suspended said rods passing into eyes in the lower ends of four vertical hanging screw bolts $j$ $j$ which pass through the cross pieces $l$ of the frame upon the upper sides of which timbers the hand nuts N secured on said rods turn for raising and lowering the curve in order to adjust its teeth to those of the cylinder.

When the machine is in motion and whenever any hard substance accidentally passes into the space between the concave and cylinder the teeth are prevented from being broken or injured by the sudden rising of the curve from the cylinder which is effected by means of the obtuse perforations $o^2$ into which the horizontal parallel suspension rods $i$ $i$ are inserted allowing said curve to rise to an extent equal to the size of said obtuse perforations and the obstructions having passed through the machine the curve by its gravity will of course descend to its former position and from the angular shape of the perforations the inclined sides thereof will be guided to its resting place without further aid.

The segment bars $m$ $n$ and teeth $k$ may be made in any of the usual modes.

The arrangement of the wings W and inclined tables T in combination with the concave C not only adapt the machine for feeding on either side at pleasure but also to promote a free draft through the machine from one side to the other according to the motion of the cylinder. The concave C catching all the grain and chaff that would otherwise have a tendency to fall below the machine. The arrows indicate the direction of the aforesaid draft through the machine produced by the segment of a smooth cylinder C placed below the beaters when the beaters turn to the right. When they turn to the left the draft will be in a contrary direction.

What I claim as my invention and which I desire to secure by Letters Patent is—

1. The dovetail form of the base of the beaters adapted to be taken out of and inserted into the dovetailed grooves in the peripheries of the rings of the cylinders as described in the manner and for the purpose set forth.

2. I likewise claim the construction and arrangement of the curve $n$ so that it can be adjusted to the cylinder at pleasure by the screws $j$ and nuts N and likewise be self adjustable when any hard substances enter the machine by means of the obtuse angled perforations $o$ and rods $i\ i$ passing into said perforations as before described.

JESSE BOWLES.

Witnesses:
 ARNOLD ANDERSON,
 R. K. BOWLES.